United States Patent [19]
Winterhalter et al.

[11] 3,771,962
[45] Nov. 13, 1973

[54] METHOD AND APPARATUS FOR MEASURING TOTAL ORGANICS IN AQUEOUS SOLUTIONS

[75] Inventors: David R. Winterhalter, Berkeley; Vigo N. Smith, Alameda, both of Calif.

[73] Assignee: Shell Oil Company, New York, N.Y.

[22] Filed: May 28, 1971

[21] Appl. No.: 147,916

[52] U.S. Cl............................ 23/253 PC, 23/230 PC
[51] Int. Cl. .............................................. G01n 31/12
[58] Field of Search.................. 23/230 PC, 253 PC

[56] References Cited
UNITED STATES PATENTS 3,050,372   8/1962   Scott............................... 23/230 PC
3,205,045   9/1965   Von Lossberg............. 23/230 PC X

OTHER PUBLICATIONS

Franklin Institute, Report on Water Gas, 1886, TP760F82, pages 36, 41, 49 relied on.

*Primary Examiner*—Robert M. Reese
*Attorney*—Theodore E. Bieber and Harold L. Denkler

[57] ABSTRACT

A method and apparatus for measuring the total organics in water wherein a sample of the water is introduced into a heated furnace to oxidize the organics to form hydrogen and carbon dioxide, the water is separated from the gaseous reaction products by condensation and the non-condensible gases conveyed by a carrier gas to a detector sensitive to hydrogen.

3 Claims, 2 Drawing Figures

PATENTED NOV 13 1973　　3,771,962

V.N. Smith
D.R. Winterhalter
INVENTORS

METHOD AND APPARATUS FOR MEASURING TOTAL ORGANICS IN AQUEOUS SOLUTIONS

BACKGROUND OF THE INVENTION

The present invention relates to a method and apparatus for continuously monitoring the total organics in water. The problem of monitoring organics in water is critical and need for reliable instruments that require little or no maintenance and are inexpensive to operate remains unsolved. For example, it is becoming increasingly important to maintain an accurate monitoring of refinery cooling water and effluent streams to prevent the accidental discharge of organic material into rivers, streams and other watersheds. Also the oil content of brines produced in oil fields must be monitored before the brines are disposed of by dumping them into the sea or deep disposal wells. Further, the cargo tanks of tankers are washed with sea water between loads and the oil content of the waste water must be monitored before it may be disposed.

The above applications require that the monitoring instrument be able to tolerate waters that have high dissolved solid contents with significant amounts of inorganic carbon. Also the monitoring process must be sensitive at least to one part per million of organic carbon with an accuracy of 10–20 percent of the reading. Likewise the process should be insensitive to the form of organic carbon and operate unattended under adverse field conditions for prolonged periods of time.

Several systems have been proposed for measuring organic contaminants in water, which are based on the vaporizing of the water and the oxidizing of the organics. The gases are monitored for carbon dioxide or carbon monoxide content which is taken as a measure of the organics in the original water sample.

The difficulties with using the above systems are that they require pure gas or other reagent sources since any organic material or carbonaceous material in the reagents will add to the organic material in the water sample. Further, the monitoring of the carbon dioxide produced by the oxidation of the organic material will not indicate whether the original carbon was in the form of inorganic or organic material. In the case of petroleum processes where the material of interest is the organic carbon, this would give faulty readings which could possibly indicate the presence of organic material beyond acceptable limits, when in fact no organic material was present.

SUMMARY OF THE INVENTION

The present invention solves the above problems by providing a system in which a sample of the water containing organic material is supplied to a high temperature oxidation chamber. In the oxidation chamber the organic material is oxidized with the water to produce vaporized water, carbon dioxide, and hydrogen. The resulting mixture is cooled to a temperature of about 150 C and mixed with a small stream of ambient air. Then the mixture is passed to a condenser where the vaporized water is condensed and removed leaving a gas stream containing hydrogen, carbon dioxide and air. The gas stream is then monitored by a combustible gas detector for the total hydrogen contained in the gas stream. This provides a measurement of the original organic material in the water sample and discriminates against any inorganic carbon present. Inorganic carbon is generally in the form of carbonate ion which is converted to carbon dioxide in the furnace.

BRIEF DESCRIPTION OF THE DRAWINGS

The present invention will be more easily understood from the following detailed description when taken in conjunction with the attached drawings in which.

DESCRIPTION OF THE PREFERRED EMBODIMENT

Figure 1:
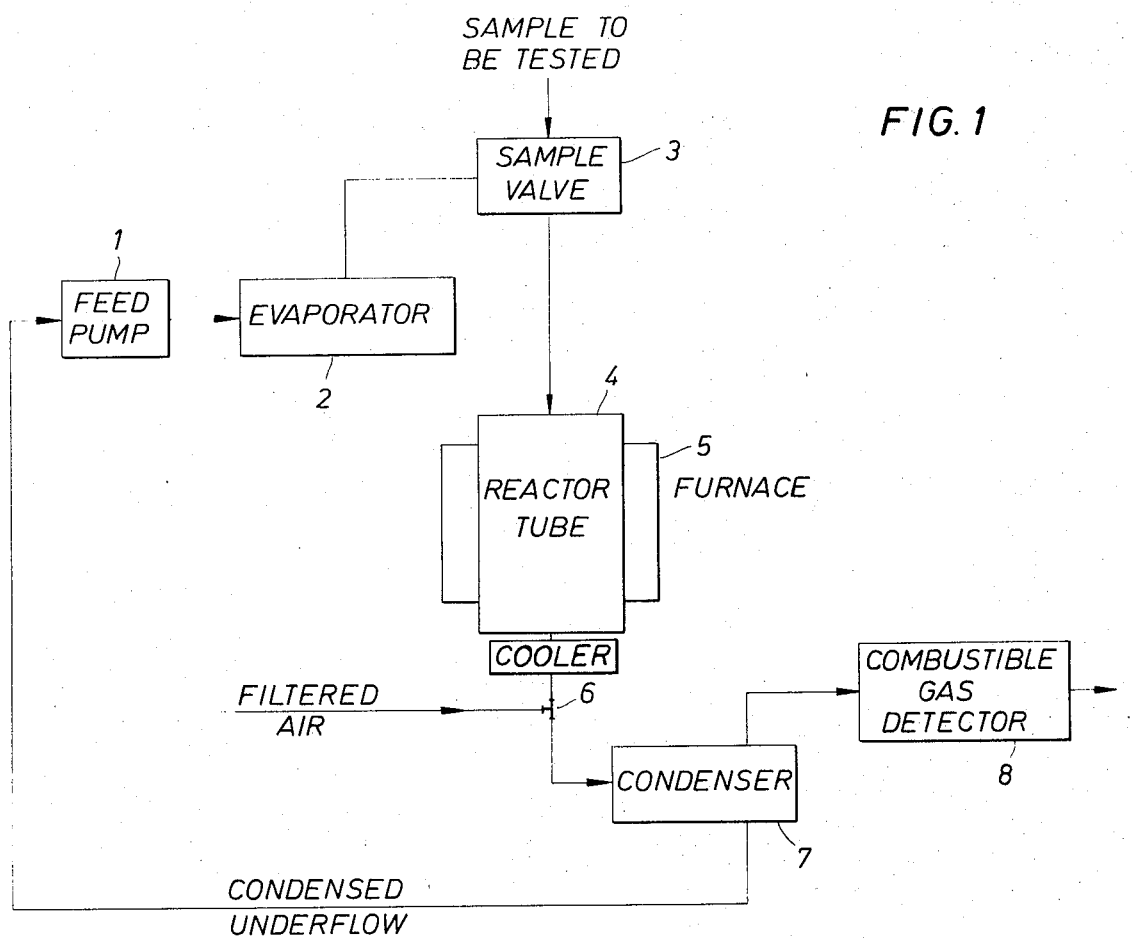
FIG. 1 is a block diagram of one apparatus suitable for practicing this invention.

Referring to the enclosed drawings, there is shown in block diagram form a system suitable for performing the method of this invention. A constant flow rate pump 1 pumps pure carrier water to a steam generator 2 wherein the water is vaporized. The resulting steam is passed to a sampling valve 3 by means of which a known-volume sample of the water to be tested is introduced and then carried by the steam to the reactor through a nozzle which prevents the evaporation of the sample and subsequent deposition of dissolved solids at the entry point. The reactor tube 4 is composed of a non-porous ceramic material and is heated by the surrounding furnace 5 to about 800 C to 1,000°C. The reactor tube is packed with ceramic chips to insure intimate thermal contact with the sample in the reactor. A platinum catalyst is added to the ceramic packing to promote the desired reactions. The hot gases are discharged from the reactor and cooled to about 150 C. A small stream of filtered air is then mixed with the gases at 6 and the mixture passed to a condenser 7. The condenser acts as a condenser-separator to condense and separate water-vapor while discharging the non-condensible gases to a combustible gas detector 8, as for example a thermal conductivity detector. The non-condensible gases are separated from the condensed water vapor by gravity while the condensed water vapor may be removed by a suitable underflow line. The construction details of the condenser are shown in FIG. 2 and described below.

The combustible gas detector senses the hydrogen content of the non-condensible gas stream and is a commercially available device. The hydrogen content of the non-condensible gas stream is related to the organic carbon content of the water sample being tested.

Figure 2:
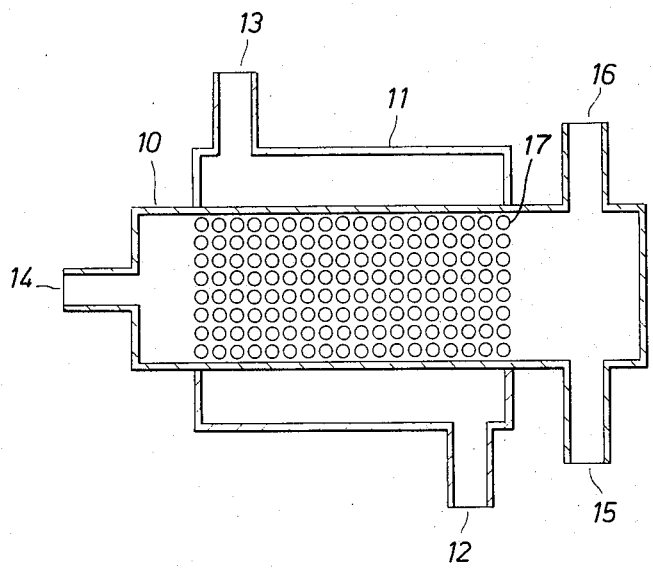
FIG. 2 is a detailed elevation view of a condenser suitable for use with the present invention.

Referring to FIG. 2, there is shown a vertical section of the condenser-separator 7. The condenser comprises an inner shell 10 and an outer shell 11, and a suitable inlet 12 and outlet 13 communicate with the annular space between the inner and outer shells in order that cooling waterre circulated through the condenser. The volume enclosed by the inner shell has an inlet 14 and liquid outlet 15 and a non-condensible gas outlet 16. The central part of this inner chamber isacked with is packed diameter metallic elements 17, preferably small diameter copper balls which have been pressed into intimate contact with each other and with the chamber walls. This insures a large surface area for good contact between the vapor and the cooling medium while at the same time minimizing the free volume of the condensing chamber.

The condensed water, being free of organic materials may be recirculated to the constant rate feed pump 1.

Thus, the only reagent required for the operation of this method is ambient air.

OPERATION OF THE PREFERRED EMBODIMENT

The method of the present invention consists of supplying pure water to the constant rate of feed pump 1 that discharges to the evaporator 2. A known volume sample of the water to be tested is injected into the steam stream from the evaporator by means of a 6-way sampling valve 3. The steam and sample are then conveyed into the hot zone of the reactor 4. In the reactor the sample is completely vaporized by contact with the reactor packing material. The reactor packing material is maintained at high enough temperature in the sample evaporation zone to ensure thermal decomposition of any organic substances in the sample.

The organic materials and their pyrolysis fragments in the sample react with some of the water vapor in the reactor to form carbon dioxide and hydrogen. Normally this requires a temperature of approximately 800°C to 1,000°C in the presence of a platinum catalyst. The vapor from the reactor tube is discharged and cooled to approximately 150 C and is then mixed with a small stream of filtered air. The resulting mixture of air, steam, hydrogen and carbon dioxide is conveyed to the condenser-separator where the water vapor is condensed, separated by gravity and removed by a suitable underflow line. The non-condensible mixture of air, hydrogen and carbon dioxide passes to a combustible gas detector which is sensitive to the hydrogen content of the mixture. The output signal from the combustible gas detector is recorded on a suitable chart recorder. This signal represents the amount of hydrogen produced in the reactor and hence is relatable to the amount of organic material in the water sample under test.

The condensed water, being free of organic material, is returned to the feed pump intake for recirculation through the apparatus.

As explained above, since the detector is sensitive only to combustible gases (hydrogen) while discriminating against carbon dioxide, the recorded signal is directly related to the organic material contained in the water sample and does not include the inorganic material as was the case with prior systems. The inorganic carbonacious material is in the form of carbonate ion which forms carbon dioxide upon heating in the reactor. This is an important feature of the present invention since it permits it to be used in refinery processes to monitor the effluent streams for detecting organic or petroleum products in them.

We claim as our invention:

1. An apparatus for measuring the total organics in an aqueous sample comprising:
    a pump having an inlet and discharge for supplying a constant flow of pure water;
    an evaporator having an inlet and discharge openings, the discharge of said pump being coupled to the inlet opening said evaporator for converting said water to steam;
    a valve means, said valve means communicating with the discharge opening of said evaporator and disposed to inject a known wolume of water to be tested into said steam;
    a reactor, said steam and water sample being supplied to said reactor;
    a furnace, said furnace being disposed to maintain the temperature of said reactor at approximately 800°C;
    a condenser, said reactor being coupled to said condenser for condensing the steam and separating the condensate from the non-condensible gases and discharging said non-condensible gas through an outlet; and
    a detector sensitive to hydrogen, said detector being coupled to the non-condensible gas outlet of said condenser for measuring the quantity of hydrogen present in the non-condensible gases.

2. The apparatus of claim 1 wherein said reactor is filled with an inert material to improve thermal contact in the reactor.

3. The apparatus of claim 2 wherein a catalyst is added to said inert material to promote the reaction.

* * * * *